March 12, 1940. D. P. HYNES 2,193,133
HOOD LATCH
Original Filed July 11, 1938  3 Sheets-Sheet 1
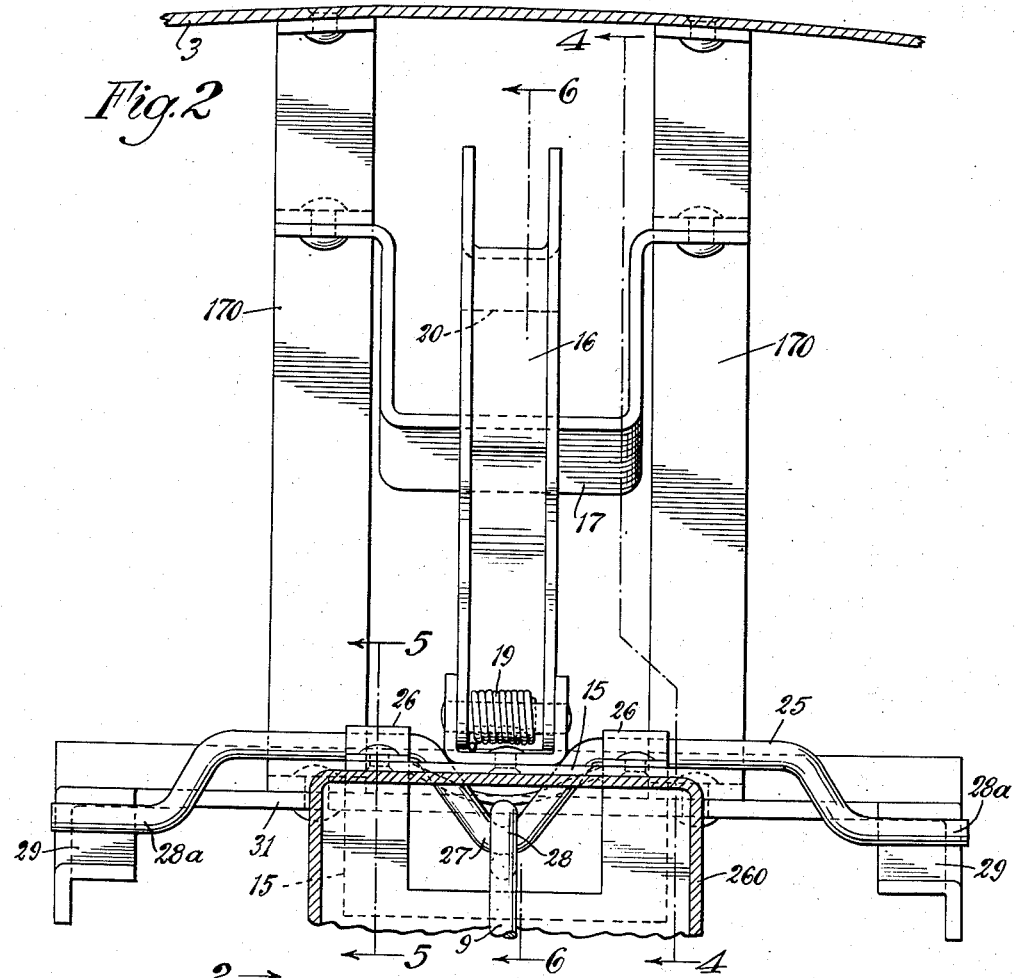
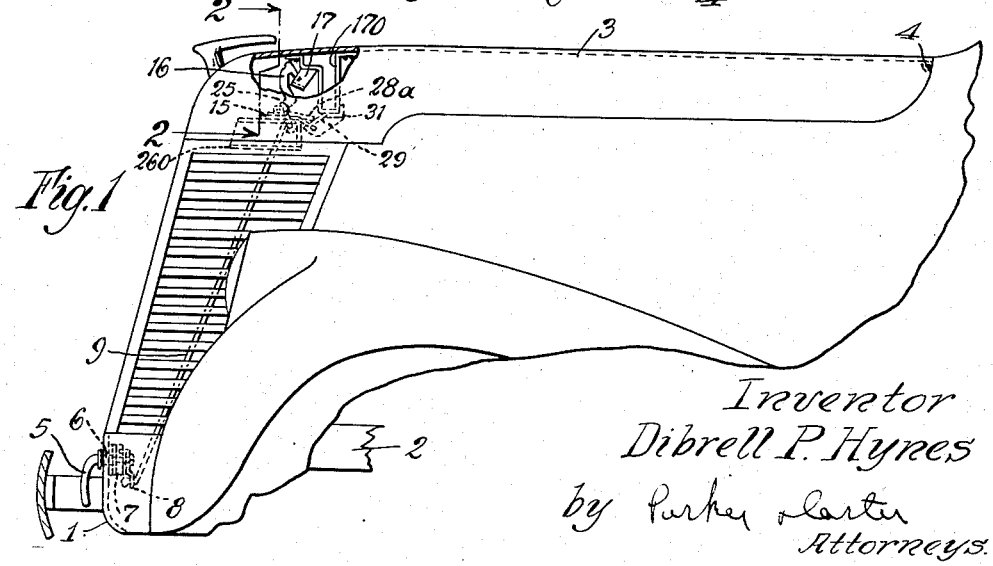
Inventor
Dibrell P. Hynes
by Parker & Carter
Attorneys March 12, 1940. D. P. HYNES 2,193,133
HOOD LATCH
Original Filed July 11, 1938   3 Sheets-Sheet 2
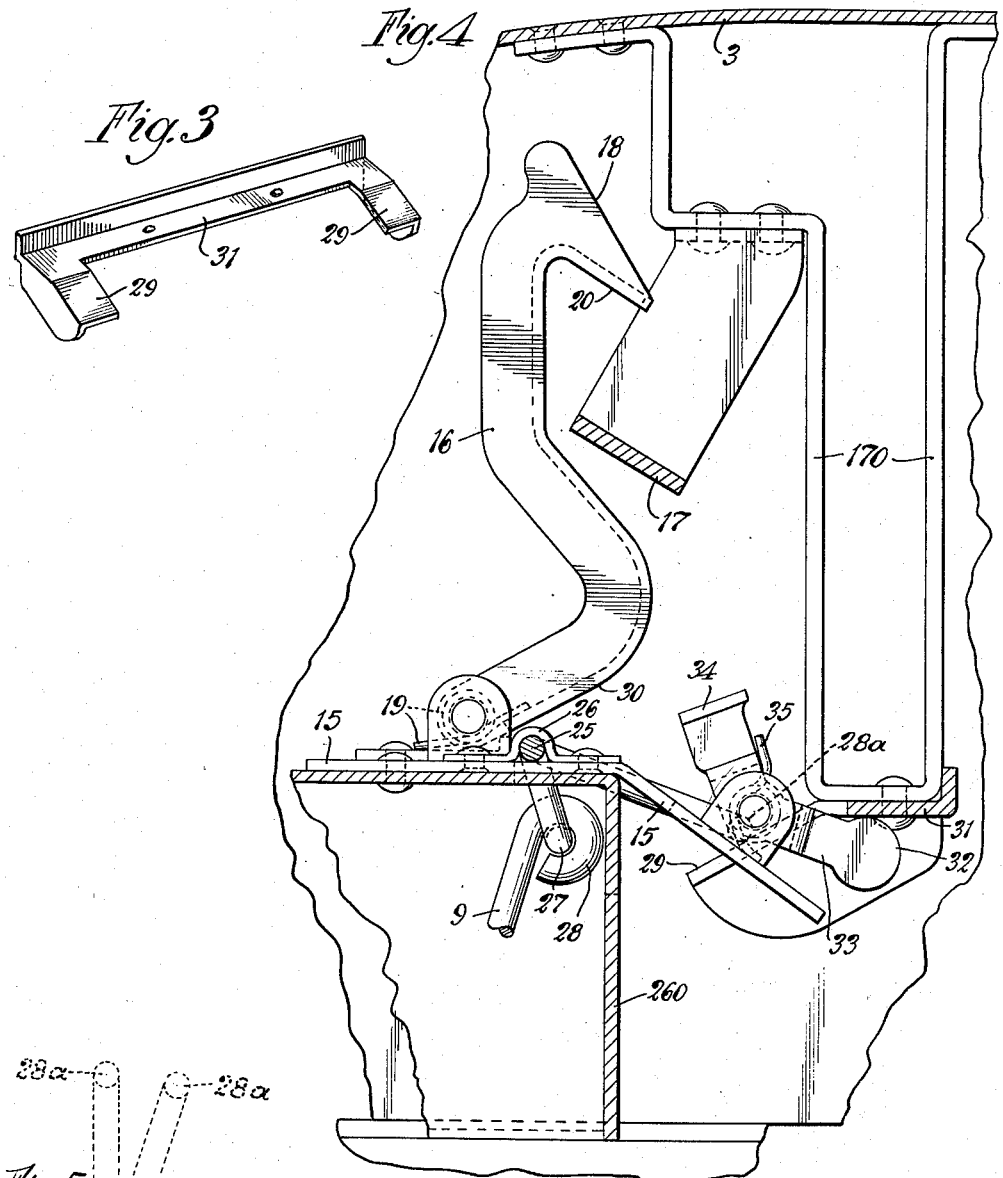
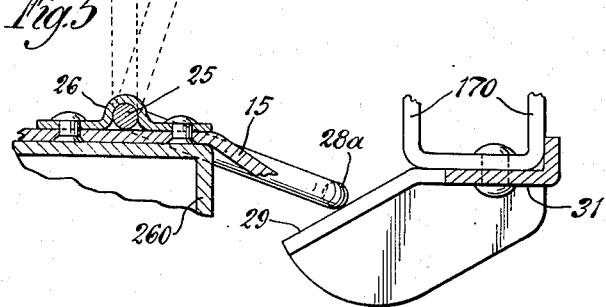
Inventor
Dibrell P. Hynes
by Parker & Carter
Attorneys March 12, 1940. D. P. HYNES 2,193,133
HOOD LATCH
Original Filed July 11, 1938 3 Sheets-Sheet 3

Inventor
Dibrell P. Hynes
by Parker & Carter
Attorneys

Patented Mar. 12, 1940

2,193,133

UNITED STATES PATENT OFFICE 2,193,133

HOOD LATCH

Dibrell P. Hynes, Evanston, Ill., assignor to Chicago Forging & Manufacturing Company, Chicago, Ill., a corporation of Illinois Original application July 11, 1938, Serial No. 220,657. Divided and this application December 24, 1938, Serial No. 247,665

7 Claims. (Cl. 292—214)

My invention relates to improvements in automobile hood latches and is especially adapted for use in connection with top panel front opening automobile hoods wherein the panel is pivoted at the rear and opens from the front. However, the application of my invention is not limited to this specific use.

One object of my invention is to prevent movement of the hand control member toward locking position except when the hood is seated in such position that the positive latch may engage it.

Another purpose is the provision of positive means for preventing movement of the normal latching means except at predetermined times.

Other purposes will appear from time to time in the course of the specification and claims.

The present application is a division of my co-pending application filed in the United States Patent Office on July 11, 1938, Serial No. 220,657.

I illustrate my invention more or less diagrammatically in the accompanying drawings wherein:

Fig. 1 is a side elevation in part section of the front end of an automobile using my latch;

Fig. 2 is a section on an enlarged scale through the line 2—2 of Fig. 1;

Fig. 3 is a perspective of the cam abutting supporting bracket;

Fig. 4 is a section on the line 4—4 of Fig. 2;

Fig. 5 is a section along the line 5—5 of Fig. 2 showing a slightly different position of the parts from Fig. 4;

Like parts are indicated by like symbols throughout the specification and drawings.

Figure 6:
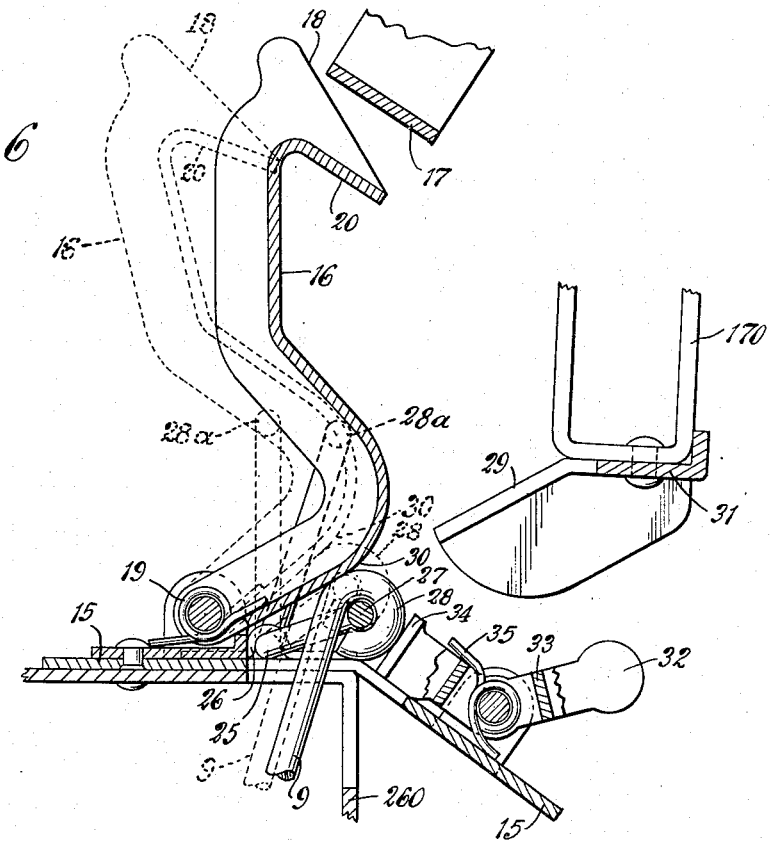
Fig. 6 is a section on the line 6—6 of Fig. 2.
Figure 7:
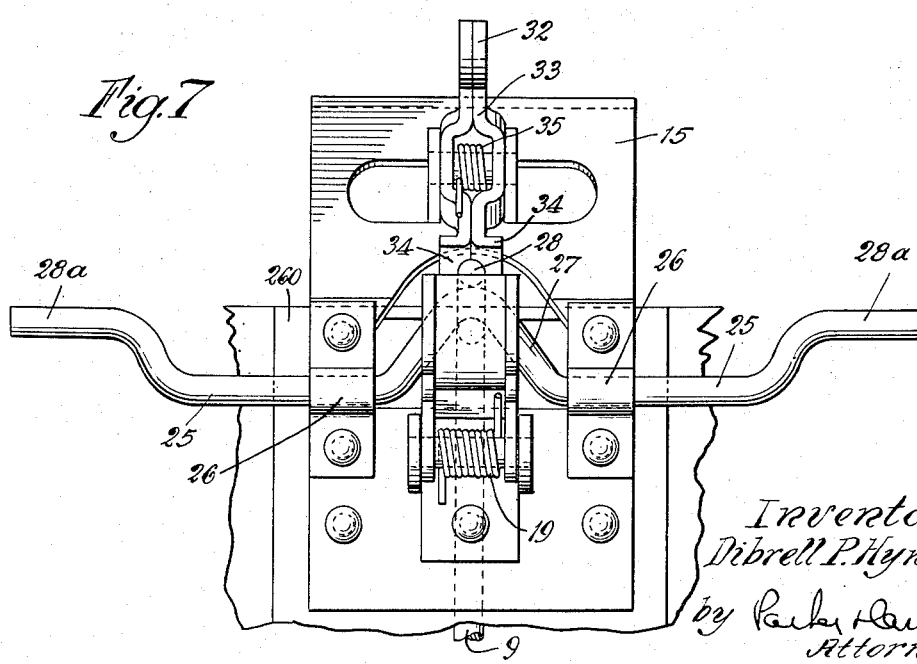
Fig. 7 is a plan view of part of the mechanism shown in Fig. 6.

Referring to the drawings, 1 is the automobile radiator grill or apron, a part of the body. 2 indicates the vehicle frame. 3 is the top panel or hood, pivoted as at 4 at the rear end. 5 is a hand lever projecting from a lock spindle 6, which spindle extends inwardly through the grill or apron and is rotatably mounted therein. 7 is a bracket assisting in supporting the spindle. 8 is a crank rigidly mounted on the spindle 6. 9 is a connecting rod extending from the lever upwardly inside the grill or apron to the latch.

15 is a bracket upon which the hood latch itself is mounted. Upon this bracket is pivoted the safety latch hook 16, adapted to engage with a safety latch abutment 17, supported on a frame 170, depending from the hood. The hook has a cam surface 18, adapted to be engaged by the under side of the abutment 17 as it comes down to rotate the hook to the left to permit the abutment to pass below the end of the hook. 19 is a spring which permits the hook to yield and snaps it back into position above the abutment 17. In closed position the abutment 17 is located a few inches below the hook. The abutment 17 and the abutment engaging portion 20 are inclined so as to provide a positive hook action so that if the hood latch is not otherwise fastened and blows open, the abutment 17 and the surface 20 on the hook interlock, positively preventing opening beyond a predetermined point.

Pivoted on the bracket 15 is a positive hood latch crank 25, supported in bearings 26 on a frame 260 which projects upwardly from the vehicle frame. The offset central portion 27 of this crank, located between the bearings 26, is engaged by an eyelet 28, on the upper end of the connecting rod 9, so that manipulation of the handle 5 causes rotation of the crank. The two ends of the latch crank are offset as at 28a, to engage positive lock abutments 29, adjacent each side of the vehicle hood on the bracket. When the handle is in the locking position, the latch crank normally engages at both ends with the abutments on the hood and holds it in closed or seated position.

When the handle is in the full open position, the eyelet 28, which engages the cam surface 30 on the automatic safety hook 16, moves up to swing the hook in a counterclockwise direction, throwing it out of line with the abutment 17, so that the hood can be opened. But as soon as the operator releases his hold on the handle, it allows the eyelet to come down and permits the spring 19 to move the automatic latch hook into the operative position.

The bracket 31 is supported on the frame 170. As the hood comes down to the seated position, this bracket engages a cam member 32 on one end of the safety lever 33, rotates it in a clockwise direction, and moves the safety stop 34 out of contact with the eyelet 28, so that the eyelet 28 and the crank 25 may rotate in a clockwise direction, to cause engagement of the main hood latch.

Until this safety lever 33 has been rotated, it remains held by the spring 35 in position in the path of the eyelet 28, so that it is impossible to rotate the hand lever into the locking position. The purpose of this is, of course, to insure that the user will not think that he has locked the hood by a mere rotation of the crank when, in fact, the hood was not in such a position that it could be latched.

These various elements insure, first, that whenever the hood is lowered, it is automatically caught; second, that until it is lowered into a position where it can be latched, it is impossible to manipulate the hand lever to complete the latching operation; and third, when the hood is seated, it becomes possible for the operator to latch the hood so that the hood is held positively closed and also remains in such relationship with the automatic latch that, if for any reason the hood latch should fail to hold, the hood cannot be blown wide open.

It will be realized that whereas I have described and have illustrated a practical and operative device, nevertheless many changes may be made in the size, shape, number and disposition of parts without departing from the spirit of my invention. I therefore wish to have my drawings and description taken as being in a broad sense illustrative and diagrammatic, rather than as limiting me to my precise showing.

I claim:

1. In combination with a hood for vehicle bodies and the like, a manually controlled positive hood latch, an exterior handle, and an operating connection between said exterior handle and said latch, and means for preventing movement of the handle to latching position except when the hood is seated in such position that the positive latch may move to locking position.

2. In combination with a hood for vehicle bodies and the like, a manually controlled positive hood latch, an exterior handle, and an operating connection between said exterior handle and said latch, and means for preventing movement of the handle to latching position except when the hood is seated in such position that the positive latch may move to locking position, including a movable member located within the hood, means for normally holding it in position to prevent movement of said positive latch to locking position, and means for moving said movable member to inoperative position in response to the downward movement of the hood toward closed position.

3. In combination with a hood for vehicle bodies and the like, a manually controlled positive hood latch, an exterior handle, and an operating connection between said exterior handle and said latch, and means for preventing movement of the handle to latching position except when the hood is seated in such position that the positive latch may move to locking position, including a lever adapted normally to lie in a position adapted to impede the movement of the latch to locking position, and an abutment member on the hood adapted, as the hood seats in closed position, to move said lever into inoperative position.

4. In combination with a hood for vehicle bodies and the like, a rotatable latch member, means for rotating said latch member into and out of locking position, a member adapted normally to prevent rotation of said latch toward locking position, and means on the hood adapted to engage said member and to move it to inoperative position in response to downward movement of the hood toward closed position.

5. In combination with a vehicle and a hood therefor, said hood being mounted for rotation about an axis located at its rear and extending horizontally transversely across the vehicle, means adapted to support said hood in a predetermined closed position, a manually controlled positive latch for said hood, located adjacent the front end of said hood, means for impeding closing actuation of said latch, when the hood is moved from fully closed position, and means for rendering said impeding means inoperative in response to the downward movement of the hood toward closed position.

6. In a hood latching arrangement wherein an encasing portion of the hood is pivoted adjacent the rear end thereof for rotation about a generally transverse horizontal axis, a manually controlled positive hood latch located adjacent the front end of the hood, an exterior handle, and an operating connection between said exterior handle and said latch, and means for preventing movement of the handle to latching position except when the hood is seated in such position that the latch may move to locking position.

7. In a hood latching arrangement wherein an encasing portion of the hood is pivoted adjacent the rear end thereof for rotation about a generally transverse horizontal axis, a manually controlled positive hood latch located adjacent the front end of the hood, an exterior handle, and an operating connection between said exterior handle and said latch, and means for preventing movement of the handle to latching position except when the hood is seated in such position that the latch may move to locking position, including a movable member and means for normally holding it in position to prevent movement of said positive latch to locking position, and means for moving said movable member to inoperative position in response to the downward movement of the hood toward closed position.

DIBRELL P. HYNES.